Aug. 5, 1958 R. L. WALSH 2,846,167
AIRCRAFT PANEL CONSTRUCTION
Filed May 31, 1956
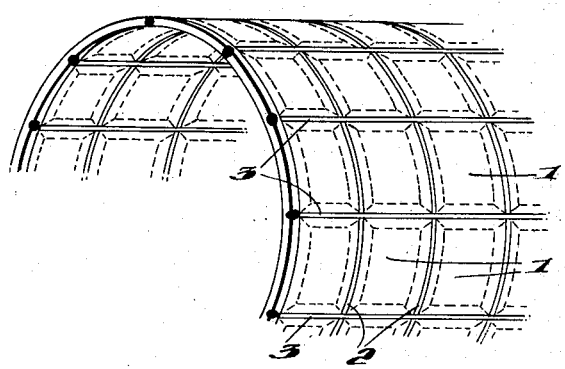
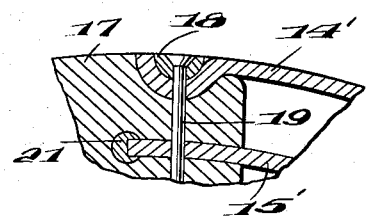
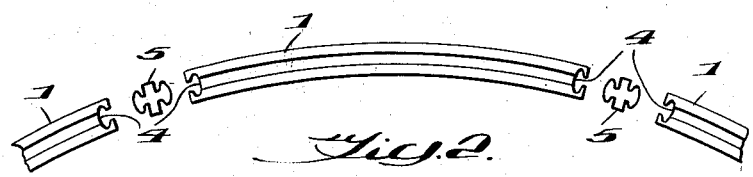
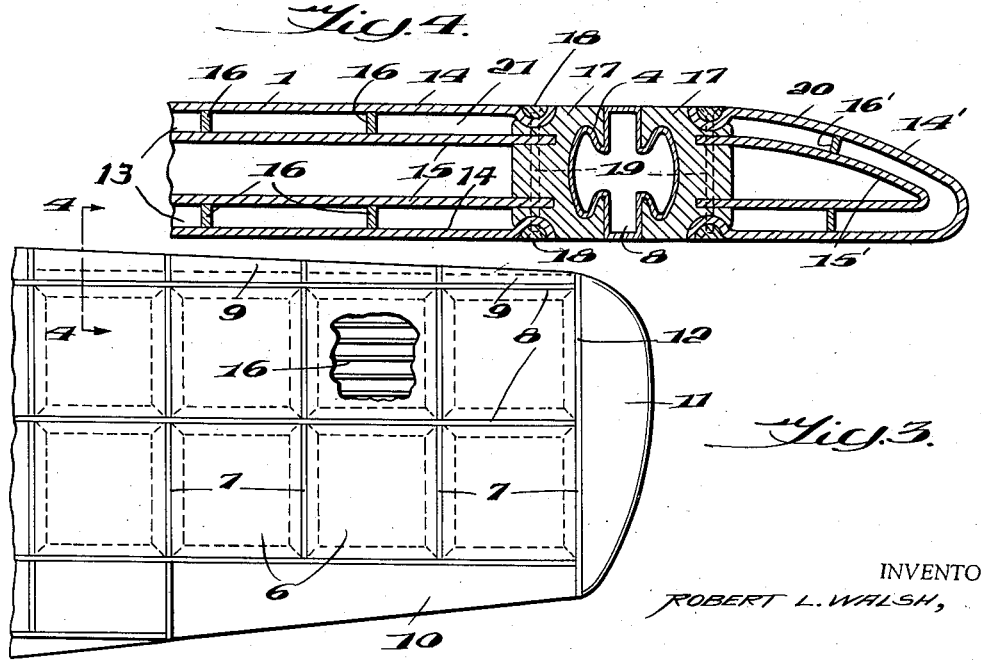
INVENTOR
ROBERT L. WALSH,
BY Stevens, Davis, Miller & Mosher
ATTORNEYS

United States Patent Office 2,846,167
Patented Aug. 5, 1958

2,846,167

AIRCRAFT PANEL CONSTRUCTION

Robert L. Walsh, Washington, D. C.

Application May 31, 1956, Serial No. 588,378

9 Claims. (Cl. 244—124)

This invention relates to aircraft construction, more particularly to a structure readily adapted to, and advantageous in, missile construction.

Missiles or pilotless aircraft are aircraft in the sense that they have airfoils for sustenation, a power plant and a guidance system to direct them to a target but once on target, they are expendable. Present day missiles or pilotless aircraft are constructed with the same materials and techniques as are piloted aircraft and are therefore unduly expensive since they require tooling for fabrication of subassemblies, comparable with that of conventional aircraft. Some missiles are broken down into major subassemblies such as wing panels and fuselages but this is done usually for the purpose of transportation and assembly at a firing location. Fabricated sheet metal construction requires considerable hand labor and tooling to produce a missile subassembly. Forging of major portions such as reinforced skin panels may reduce the labor and detail manufacturing costs but metal construction of any type requires careful storage because of the corrosion problem.

It is therefore an object of the present invention to overcome the above-described disadvantages of missile construction by conventional aircraft tooling and techniques, by providing a construction of reinforced, nonmetallic panels capable of being readily assembled into fuselages or wing structures.

It is another object of this invention to provide a panel construction for aircraft or missile components in which panels are prefabricated and due to multiple use of similar panels, tooling costs are reduced.

It is another object of this invention to provide a construction technique for missiles or aircraft components of lightweight panel subassemblies which are high in strength and low in cost such as to be expendable.

Further and other objects of this invention will be seen from the description of the accompanying drawings in which like numerals refer to like parts.

In the drawings:

Figure 1 shows a portion of a fuselage subassembly in accordance with this invention;

Figure 2 is an exploded view showing the relationship of panels and interconnecting strips of the construction shown in Figure 1;

Figure 3 is a plan view of an aerodynamic section or airfoil such as the wing of a missile or aircraft, assembled in accordance with this invention;

Figure 4 is a section taken on line 4—4 of Figure 3; and

Figure 5 is an enlarged and fragmentary view of the construction of the individual panel.

Figure 1 shows a subassembly such as the fuselage of an aircraft comprising individual panel members 1 of quadrilateral shape. A plurality of such panels 1 may be placed edge-to-edge to form a strip of panels. The individual panels of the strip are joined together at their edges by interlocking strips 2. Strips of interlocked panels 1 are then joined together by longitudinally extending interlocking strips 3, which assembles strips of panels into an array of panels forming a subassembly of the fuselage construction. Panels 1 can be curved or contoured to conform with the desired ultimate shape of the subassembly. It is merely necessary that the design of the fuselage be such that the surface lends itself to quadrilateral panel construction.

As shown in Figure 2, individual panels are formed with a groove 4 in the peripheral edges thereof, so that interlocking strips 5 may be inserted in grooves 4 in the edges of adjacent panels 1 to interlock adjacent panels together. Interlocking strip 5 is typical of strips 2 and 3 described in connection with Figure 1. Strips 2 extend the full width of the side or edge of the panel terminating at the groove in the elongated edge of the strip of panels. Strip 3 acts as a longeron in the fuselage construction and extends the full length of the assembled strip of panels for added strength.

In the airfoil or wing panel construction shown in Figure 3, unit panels 6 are assembled into spanwise-extending strips of panels arranged longitudinally of the wing spar by short, intermediate interlocking strips 7. Spanwise-extending interlocking strips 8 secure strips of panels 6 together into a subassembly. Leading edge portions 9 are preformed and secured to the subassembly of panels by strips 8. The trailing edge portion can be unitary comparable with leading edge portions 9 or formed as a single or larger section covering a greater extent of the trailing edge portion of the wing panel assembly. A wing tip portion 11 can be prefabricated to contour and secured to the wing panel by strips 12 or any other suitable means.

Figure 4 is an enlarged sectional view taken on the line 4—4 of Figure 3 showing the details of construction of the unit panel as well as the interlocking strip and leading edge portion. The unit panel indicated as 1 consists of a pair of surface members 13 each consisting of outer and inner skin members 14 and 15, separated by spacing members 16. Surface members 13 are fabricated from sheets of fiber glass reinforced plastic, thermosetting resin-impregnated fiber glass, or any other stabilized fiber glass material. The edges of sheets 14 and 15 may be preformed or precontoured to be secured in similarly formed grooves for additional strength. Spacer ribs 16 are of the same fiber glass reinforced material and may be bonded between sheets 14 and 15, or member 13 may be molded to comprise surfaces 14 and 15 with spacing ribs 16, as a unitary structure. The frame or edge of the panel 17 is an extrusion of metal or plastic having grooves on one edge to receive and secure edges 14 and 15 of members 13. Where additional strength is required, the edges of sheets such as 15 may be formed with a bead 21, as shown in Figure 5.

To obtain a flush surface on the panel a filler strip 18 is positioned within the formed edge of sheet 14. A rivet or bolt or other fastening means 19 extends between the upper and lower surfaces of the panel to secure members 14, 15 and 18 firmly in frame member 17 to form a unitary construction. The other edge of frame member 17 is formed with a groove 4, which may be of any contour that will interlock with a strip 8. Strip 8 extends along the span or sparwise of the airfoil or wing assembly and with adjacent members 17 forms a spar for cantilever strength in the wing. Strip 8 may either be a solid metal or plastic extrusion or hollow from strength and weight considerations. It is contemplated in some constructions that the hollow strip 8 will afford passage for wiring or hydraulic or fluid lines for many purposes.

Leading edge section 20 may be formed to any contour similar to the construction of sheet 13 with outer sheet 14' and inner sheet 15' separated by spacer member 16', The trailing edge may be similarly formed with members 14' and 15' affording the conventional sharp trailing edge.

From the above description it will be apparent that major subassemblies of missiles making up fuselage sections or wing sections can readily be broken down into unit panel construction as described above. Due to the symmetry of subassemblies in missile or aircraft construction, identical panels can be utilized, thus effecting considerable saving in tooling costs. The assembly of the panels as described through the use of interlocking strips such as 2, 3, 7 or 8 renders the assembling of panels a very quick and inexpensive operation.

The use of fiber glass construction for the surface sheets of the panels, frame members and interlocking members affords maximum protection against corrosion if the subassemblies are stored for long periods of time. Where greater strength is required, frame members 17 and interlocking strip such as 18 will be fabricated from metal.

Strength considerations may dictate that spacer strip 16 in the surface sheets in wing construction should extend sparwise, while in fuselage construction they should extend longitudinally thereof, that is along the direction subjected to the greatest tension or deflection loads.

In high-speed missile construction, where heat may be a consideration, it may be desirable to provide apertures in frame 17 affording intercommunication between panel spaces 21 for the circulation of a cooling medium.

It is to be understood that certain changes, modifications and alterations may be made without departing from the spirit and scope of the appended claims.

I claim:

1. A panel construction for aircraft comprising a plurality of panels placed edge-to-edge, each of said panels consisting of a pair of surface members, each of said surface members comprising a pair of sheets having spacing members therebetween, the edges of said sheets secured to the inside edges of a quadrilateral frame, the outer edges of said frame having grooves formed therein and an interlocking strip between adjacent panels interlocking with the edge grooves thereof to form a unitary structure.

2. A panel construction for aircraft subassemblies comprising a plurality of panels placed edge-to-edge, each of said panels consisting of a pair of surface members, each of said surface members comprising a pair of sheets having spacing members therebetween, the edges of said sheets secured to the inside edges of a quadrilateral frame, and a strip between adjacent panels interlocking with the edges thereof to form a unitary panel structure.

3. A panel construction for aircraft subassemblies according to claim 2, in which the individual panels are curved to conform to the contour of said subassembly.

4. A panel construction for aircraft subassemblies according to claim 1, in which said sheets of said surface members are fiber glass reinforced thermosetting resin.

5. A panel construction for aircraft subassemblies according to claim 1, in which said sheets of said surface members are fiber glass reinforced plastic.

6. A panel construction for aircraft subassemblies according to claim 1, in which said frame consists of extruded members each having the inner edge thereof formed to receive and engage the edges of said sheets and the outer edge thereof formed to interlock with said interlocking strip.

7. A panel construction for aircraft subassemblies according to claim 1, in which the sheets of the surface members are stabilized fiber glass construction.

8. A panel assembly for aircraft wing construction comprising a plurality of similar panels placed edge-to-edge to form a spanwise strip, each of said panels consisting of a pair of surface members, each of said surface members comprising a pair of sheets having spacing members therebetween, the edges of said sheets secured to the inside edges of a quadrilateral frame, a strip member between adjacent edges of said panel formed to interlock with the edges thereof, said strip extending chordwise for the full length of the edge of said panel, other strip members extending longitudinally of said spanwise strip of panels and interlocking therewith to secure a plurality of strips of panels together in interlocking relationship to form a unitary wing panel construction.

9. A panel assembly according to claim 8 in which said panels are curved to conform to the contour of said wing construction.

References Cited in the file of this patent

UNITED STATES PATENTS

| 2,192,567 | Waugh | Mar. 5, 1940 |
| 2,569,902 | Rienau et al. | Oct. 2, 1951 |

FOREIGN PATENTS

| 125,774 | Great Britain | Apr. 28, 1919 |